(12) United States Patent  
Hatta et al.

(10) Patent No.: US 9,435,913 B2  
(45) Date of Patent: Sep. 6, 2016

(54) INTERLAYER FOR LAMINATED GLASS, AND LAMINATED GLASS

(75) Inventors: Bungo Hatta, Osaka (JP); Kazuhiko Nakayama, Shiga (JP); Minoru Inada, Shiga (JP); Yuji Masaki, Brussels (BE); Jun Hikata, Osaka (JP)

(73) Assignees: SEKISUI CHEMICAL CO., LTD., Osaka (JP); ASAHI GLASS COMPANY, LIMITED, Tokyo (JP)

( * ) Notice: Subject to any disclaimer, the term of this patent is extended or adjusted under 35 U.S.C. 154(b) by 510 days.

(21) Appl. No.: 13/817,611

(22) PCT Filed: Aug. 19, 2011

(86) PCT No.: PCT/JP2011/068798  
§ 371 (c)(1),  
(2), (4) Date: Apr. 3, 2013

(87) PCT Pub. No.: WO2012/023616  
PCT Pub. Date: Feb. 23, 2012

(65) Prior Publication Data  
US 2013/0194659 A1 Aug. 1, 2013

(30) Foreign Application Priority Data  
Aug. 20, 2010 (JP) .................... 2010-185044

(51) Int. Cl.  
G02B 5/22 (2006.01)  
G02B 1/04 (2006.01)  
B32B 17/10 (2006.01)  
(Continued)

(52) U.S. Cl.  
CPC ........... G02B 1/04 (2013.01); B32B 17/10036 (2013.01); B32B 17/10678 (2013.01); B32B 17/10688 (2013.01); B32B 17/10761 (2013.01); C08K 5/3417 (2013.01); C08K 5/3475 (2013.01); G02B 5/223 (2013.01)

(58) Field of Classification Search  
CPC ............ G02B 1/00; G02B 1/04; G02B 5/00; G02B 5/003; G02B 5/208; G02B 5/22–5/226; B32B 17/00; B32B 17/06; B32B 17/10; B32B 17/10009; B32B 17/10036; B32B 17/1055; B32B 17/10678; B32B 17/10688; B32B 17/10761; C08K 5/3417; C08K 5/3475  
USPC .................. 359/350, 361; 524/81, 86–87, 94  
See application file for complete search history.

(56) References Cited

U.S. PATENT DOCUMENTS 7,525,717 B2 * 4/2009 Byker .................. C09K 9/02  
345/106  
7,886,871 B2 2/2011 Miyai  
(Continued)

FOREIGN PATENT DOCUMENTS

CN 101466746 6/2009  
EP 0 477 844 4/1992  
EP 2 248 779 11/2010  
(Continued)

OTHER PUBLICATIONS

Chinese non-patent literature, ISBN 978-7-5019-7121-3, Jan. 2010, pp. 164-166, with concise explanation.  
(Continued)

*Primary Examiner* — Derek S Chapel  
(74) *Attorney, Agent, or Firm* — Wenderoth, Lind & Ponack, L.L.P.

(57) ABSTRACT

An interlayer film for laminated glass that suppresses the transmittance of ultraviolet rays with a wave length of 400 nm to 1% or less, and has high light resistance. The interlayer film for laminated glass comprises a thermoplastic resin, an ultraviolet absorber having a structure of formula (1), and an ultraviolet absorber having a structure of formula (2), wherein the amount of the ultraviolet absorber of formula (1) is 0.001 to 0.05% by weight, and the amount of the ultraviolet absorber of formula (2) is 0.5 to 1.0% by weight;

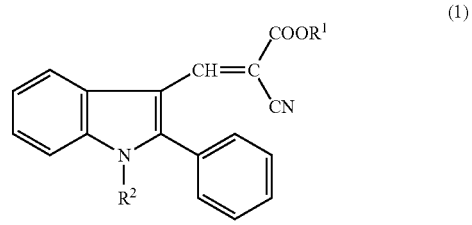

(1)

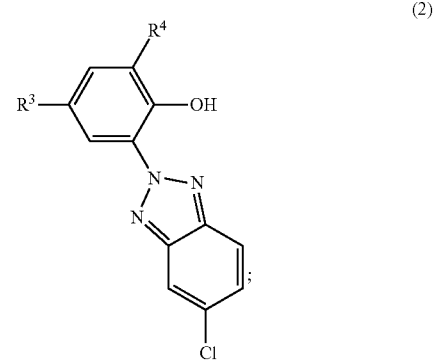

(2)

wherein $R^1$ is a $C_{1-3}$ alkyl group; $R^2$ is hydrogen, a $C_{1-10}$ alkyl group, or a $C_{7-10}$ aralkyl group; $R^3$ is hydrogen or a $C_{1-8}$ alkyl group; and $R^4$ is hydrogen or a $C_{1-8}$ alkyl group.

16 Claims, No Drawings

(51) Int. Cl.
*C08K 5/3417* (2006.01)
*C08K 5/3475* (2006.01)

(56) References Cited

U.S. PATENT DOCUMENTS

2007/0009714 A1   1/2007   Lee et al.
2010/0279150 A1   11/2010  Hatta et al.

FOREIGN PATENT DOCUMENTS

| JP | 10-17337 | 1/1998 |
|----|----------|--------|
| WO | 2007/132777 | 11/2007 |
| WO | 2007/149082 | 12/2007 |
| WO | 2009/093655 | 7/2009 |

OTHER PUBLICATIONS

"Photostabilizer and application technology thereof", published Jan. 2010, pp. 164-166.
"Shiyong Huaxuepin Peifang Shouce (Practical handbook for chemical combination)", published Mar. 2009, pp. 957-959.
Supplementary European Search Report issued Jan. 30, 2014 in European Application No. 11 81 8256.
Ciba Specialty Chemicals, "Plastic Additives", XP-002718702, <http://www.resikem.com.ar/admin/archivos/tecnica/244/TDS_Tinuvin_326.PDF>, Jun. 2002.
International Search Report issued Oct. 18, 2011 in International (PCT) Application No. PCT/JP2011/068798.

\* cited by examiner

INTERLAYER FOR LAMINATED GLASS, AND LAMINATED GLASS

TECHNICAL FIELD

The present invention relates to an interlayer film for laminated glass which can suppress the transmittance of ultraviolet rays with a wave length of 400 nm to 1% or less, and has high light resistance; and laminated glass including the interlayer film for laminated glass.

BACKGROUND ART

Laminated glass is safe because even when it is broken by impacts from the outside, the broken glass is rarely scattered around. Therefore, laminated glass is widely used for the window glass of vehicles such as automobiles and trains. Examples of laminated glass include laminated glass which is produced by interposing an interlayer film for laminated glass that includes a polyvinyl acetal resin plasticized with a plasticizer between at least one pair of glass sheets, and then integrating and laminating the resulting product.

When laminated glass is used for the window glass of vehicles such as automobiles and trains, the laminated glass is exposed to ultraviolet rays. Conventional interlayer films for laminated glass include ultraviolet absorbers in order to shield ultraviolet rays (for example, Patent Literature 1).

Among ultraviolet rays, ultraviolet rays with a wave length of 400 nm are known to damage the eyes or skins of the crews of automobiles, trains, and the like. Accordingly, there is a requirement for laminated glass which can suppress the transmittance of ultraviolet rays with a wave length of 400 nm to 1% or less, with a high transmittance of visible light maintained. However, most of the ultraviolet absorbers included in the conventional interlayer films for laminated glass do not have sufficient shielding effect of ultraviolet rays with a wave length of 400 nm. If the amount of a conventional ultraviolet absorber is increased in order to suppress the transmittance of ultraviolet rays with a wave length of 400 nm to 1% or less, it causes problems such as increased yellowness index and reduced light resistance of the laminated glass to be obtained.

CITATION LIST

Patent Literature

Patent Literature 1: Japanese Kokai Publication No. Hei-10-017337 A (JP-A Hei-10-017337)

SUMMARY OF INVENTION

Technical Problem

In view of the current situation, the present invention aims to provide an interlayer film for laminated glass which can suppress the transmittance of ultraviolet rays with a wave length of 400 nm to 1% or less, and has high light resistance; and laminated glass including the interlayer film for laminated glass.

Solution to Problem

The present invention provides an interlayer film for laminated glass including a thermoplastic resin, an ultraviolet absorber having a structure represented by the following formula (1), and an ultraviolet absorber having a structure represented by the following formula (2), wherein the amount of the ultraviolet absorber having a structure represented by the following formula (1) is 0.001 to 0.05% by weight, and the amount of the ultraviolet absorber having a structure represented by the following formula (2) is 0.4 to 1.5% by weight.

[Chem. 1]

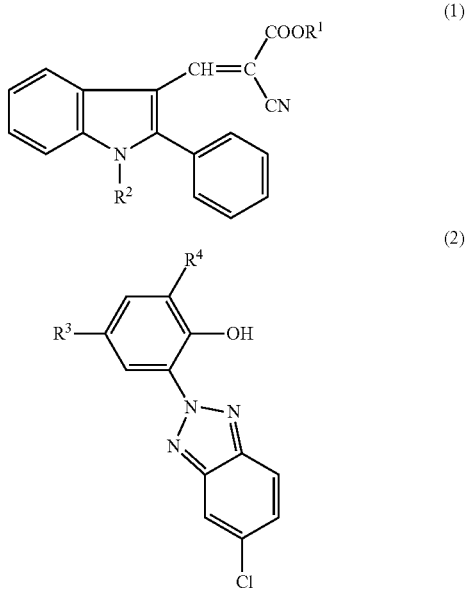

In the formula (1), $R^1$ represents a C1 to C3 alkyl group, and $R^2$ represents hydrogen, a C1 to C10 alkyl group, or a C7 to C10 aralkyl group.

In the formula (2), $R^3$ represents hydrogen or a C1 to C8 alkyl group, and $R^4$ represents hydrogen or a C1 to C8 alkyl group.

The present invention is described in detail below.

The present inventors found out that an interlayer film for laminated glass can have 1% or less of the transmittance of ultraviolet rays with a wave length of 400 nm and high light resistance along with a high transmittance of visible light if the ultraviolet absorber represented by the formula (1) and the ultraviolet absorber represented by the formula (2) are used in combination, and the amount of these ultraviolet absorbers is adjusted in a specific range.

The interlayer film for laminated glass of the present invention includes a thermoplastic resin.

The thermoplastic resin is not particularly limited, and examples thereof include polyvinyl acetal resins, ethylene-vinyl acetate copolymer resins, ethylene-acrylic copolymer resins, polyurethane resins, polyurethane resins including sulfur, and polyvinyl alcohol resins. Suitable among these are polyvinyl acetal resins because if a polyvinyl acetal resin is used with a plasticizer, the resulting interlayer film for laminated glass has excellent adhesion to glass.

The polyvinyl acetal resins are not particularly limited as long as they are produced by acetalizing a polyvinyl alcohol with an aldehyde, and preferable is a polyvinyl butyral resin. Two or more of polyvinyl acetal resins may be used in combination according to need.

A preferable lower limit of the acetalization degree of the polyvinyl acetal resin is 40 mol %, and a preferable upper limit thereof is 85 mol %. A more preferable lower limit thereof is 60 mol %, and a more preferable upper limit thereof is 75 mol %.

A preferable lower limit of the amount of the hydroxyl groups of the polyvinyl acetal resin is 15 mol %, and a preferable upper limit thereof is 35 mol %. An amount of the hydroxyl groups less than 15 mol % may lead to reduced adhesion between the interlayer film for laminated glass and glass and reduced penetration resistance of the laminated glass to be obtained. If the amount of the hydroxyl groups exceeds 35 mol %, the interlayer film for laminated glass to be obtained may be too hard. A more preferable lower limit of the amount of the hydroxyl groups is 25 mol %, and a more preferable upper limit thereof is 33 mol %.

If a polyvinyl butyral resin is used as the polyvinyl acetal resin, a preferable lower limit of the amount of the hydroxyl groups is 15 mol %, and a preferable upper limit thereof is 35 mol %. If the amount of the hydroxyl groups is below 15 mol %, the adhesion between the interlayer film for laminated glass and glass may be reduced, and the penetration resistance of the laminated glass to be obtained may be reduced. If the amount of the hydroxyl groups exceeds 35 mol %, the interlayer film for laminated glass to be obtained may be too hard. A more preferable lower limit of the amount of the hydroxyl groups is 25 mol %, and a more preferable upper limit thereof is 33 mol %.

The acetalization degree and the amount of the hydroxyl groups can be determined in accordance with JIS K6728 "Testing methods for polyvinyl butyral", for example.

The polyvinyl acetal resin can be prepared by acetalizing a polyvinyl alcohol with an aldehyde.

The polyvinyl alcohol is usually prepared by saponifying a poly vinyl acetate, and generally used is a polyvinyl alcohol with a saponification degree of 80 to 99.8 mol %.

A preferable lower limit of the polymerization degree of the polyvinyl alcohol is 500, and a preferable upper limit thereof is 4,000. If the polymerization degree of the polyvinyl alcohol is below 500, the penetration resistance of the laminated glass to be obtained may be reduced. If the polymerization degree of the polyvinyl alcohol exceeds 4,000, forming the interlayer film for laminated glass may be difficult.

A more preferable lower limit of the polymerization degree of the polyvinyl alcohol is 1,000, and a more preferable upper limit thereof is 3,600.

The aldehyde is not particularly limited, and generally, a C1 to C10 aldehyde is suitably used. The C1 to C10 aldehyde is not particularly limited, and examples thereof include n-butyl aldehyde, isobutyl aldehyde, n-barrel aldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Preferable among these are n-butyl aldehyde, n-hexyl aldehyde, and n-barrel aldehyde, and more preferable is n-butyl aldehyde. Each of these aldehydes may be used alone, or two or more of them may be used in combination.

The interlayer film for laminated glass of the present invention includes an ultraviolet absorber having a structure represented by the formula (1) and an ultraviolet absorber having a structure represented by the formula (2).

In the formula (1), $R^1$ represents a C1 to C3 alkyl group. Examples of $R^1$ include methyl, ethyl, isopropyl, and n-propyl groups. Preferable among these are methyl, ethyl, and isopropyl groups, and more preferable are methyl and ethyl groups.

In the formula (1), $R^2$ represents hydrogen, a C1 to C10 alkyl group, or a C7 to C10 aralkyl group. $R^2$ is preferably a C1 to C10 alkyl group, and more preferably a C1 to C8 alkyl group. Examples of the C1 to C10 alkyl group include methyl, ethyl, isopropyl, n-propyl, isobutyl, n-butyl, pentyl, hexyl, 2-ethyl hexyl, and n-octyl groups. Examples of the C7 to C10 aralkyl group include benzyl, phenyl ethyl, phenyl propyl, and phenyl butyl groups. The alkyl group may be an alkyl group with a main chain having a straight chain structure, or may be an alkyl group with a main chain having a branched structure.

The carbon number of $R^1$ in the formula (1) significantly affects the light resistance of the laminated glass to be obtained. The smaller the carbon number of $R^1$ is, the more excellent the light resistance of the laminated glass to be obtained is. The light resistance of the laminated glass is most excellent when the carbon number is 1. The upper limit of the carbon number of $R^1$ is 3. If the carbon number of $R^1$ is 4 or more, when the laminated glass to be obtained is used under sunlight, the transmittance of ultraviolet rays increases with the lapse of time, and the color tone of the laminated glass changes.

The lower limit of the amount of the ultraviolet absorber represented by the formula (1) is 0.001% by weight, and the upper limit thereof is 0.05% by weight. If the amount of the ultraviolet absorber represented by the formula (1) is below 0.001% by weight, a transmittance of ultraviolet rays with a wave length of 400 nm of 1% or less is impossible to achieve. If the amount of the ultraviolet absorber represented by the formula (1) exceeds 0.05% by weight, the yellowness index of the laminated glass to be obtained becomes too high. Preferably, the lower limit of the amount of the ultraviolet absorber represented by the formula (1) is 0.002% by weight, and the upper limit thereof is 0.045% by weight; more preferably, the lower limit thereof is 0.01% by weight, and the upper limit thereof is 0.04% by weight; and further preferably, the lower limit thereof is 0.03% by weight, and the upper limit thereof is 0.035% by weight.

In the formula (2), $R^3$ and $R^4$ each represent hydrogen or a C1 to C8 alkyl group. Examples of $R^3$ and $R^4$ include hydrogen and methyl, ethyl, n-propyl, iso-propyl, n-butyl, tert-butyl, pentyl, hexyl, and octyl groups. Among these, preferable examples of $R^3$ are hydrogen and methyl, tert-butyl, pentyl, and octyl groups. $R^3$ and $R^4$ may be the same or may be different.

The lower limit of the amount of the ultraviolet absorber represented by the formula (2) is 0.4% by weight, and the upper limit thereof is 1.5% by weight. If the amount of the ultraviolet absorber represented by the formula (2) is below 0.4% by weight, a transmittance of ultraviolet rays with a wave length of 400 nm of 1% or less is impossible to achieve. If the amount of the ultraviolet absorber represented by the formula (2) exceeds 1.5% by weight, the yellowness index of the laminated glass to be obtained becomes too high. Preferably, the lower limit of the ultraviolet absorber represented by the formula (2) is 0.5% by weight, and the upper limit thereof is 1.3% by weight; more preferably, the lower limit thereof is 0.6% by weight and the upper limit thereof is 1.0% by weight; and further preferably, the lower limit thereof is 0.7% by weight and the upper limit thereof is 0.9% by weight.

The interlayer film for laminated glass of the present invention may further contain a plasticizer. The plasticizer softens the interlayer film for laminated glass to be obtained, whereby high adhesion to glass can be achieved.

Examples of the plasticizer include triethylene glycol di-2-ethyl butyrate; triethylene glycol di-2-ethylhexanoate; triethylene glycol dicaprylate; triethylene glycol di-n-octanoate; triethylene glycol di-n-heptanoate; tetraethylene glycol di-n-heptanoate; tetraethylene glycol di-2-ethylhexanoate; dibutyl sebacate; dioctyl azelate; dibutyl carbitol adipate; ethylene glycol di-2-ethyl butyrate; 1,3-propylene glycol di-2-ethylbutyrate; 1,4-butylene glycol di-2-ethylbutyrate; 1,2-butylene glycol di-2-ethylbutyrate; diethylene glycol di-2-ethylbutyrate; diethylene glycol di-2-ethylhexanoate; dipropylene glycol di-2-ethylbutyrate; triethylene glycol di-2-ethylpentanoate; tetraethylene glycol di-2-ethylbutyrate; diethylene glycol dicapriate; triethylene glycol di-n-heptanoate; tetraethylene glycol di-n-heptanoate; triethylene glycol di-2-ethyl butyrate; adipic acid dihexyl; adipic acid dioctyl; hexylcyclohexyl adipate; diisononyl adipate; heptyl nonyl adipate; dibutyl sebacate; oil-modified alkyd sebacate; mixtures of a phosphoric acid ester and an adipic acid ester; mixed adipic acid esters produced from an adipic acid ester, a C4 to C9 alkyl alcohol, and a C4 to C9 cyclic alcohol; and C6 to C8 adipic acid esters such as adipic acid hexyl. Among these plasticizers, triethylene glycol-di-2-ethylhexanoate (3GO) is particularly suitable to use.

The amount of the plasticizer is not particularly limited, and a preferable lower limit of the amount thereof is 30 parts by weight, and a preferable upper limit thereof is 70 parts by weight, based on 100 parts by weight of the thermoplastic resin. If the amount of the plasticizer is below 30 parts by weight, the interlayer film for laminated glass becomes too hard, possibly resulting in reduced handling characteristics. If the amount of the plasticizer exceeds 70 parts by weight, the plasticizer may be peeled off the interlayer film for laminated glass. More preferably, the lower limit of the amount of the plasticizer is 35 parts by weight, and the upper limit thereof is 63 parts by weight.

The interlayer film for laminated glass of the present invention may further include an infrared absorbing agent. The infrared absorbing agent can contribute to high heat insulation.

The infrared absorbing agent is not particularly limited as long as it has the property of shielding infrared rays, and suitable examples thereof include the one made of tin-doped indium oxide particles.

The interlayer film for laminated glass of the present invention may further include antioxidants, light stabilizers, adhesion control agents, colorants, dyes, and fluorescent whitening agents, according to need.

The antioxidants are not particularly limited, and examples thereof include 2,2-bis[[[3-(3,5-di-tert-butyl-4-hydroxyphenyl)propionyl]oxy]methyl]propane-1,3-diol1,3-bis [3-(3,5-di-tert-butyl-4-hydroxyphenyl)propionate], 4,4'-thiobis(6-tert-butyl-3-methylphenol), 4,4'-dimethyl-6,6'-di (tert-butyl) [2,2'-methylenebis(phenol)], 2,6-di-t-butyl-p-cresol, and 4,4'-butylidenebis-(6-t-butyl-3-methylphenol).

A preferable lower limit of the thickness of the interlayer film for laminated glass of the present invention is 0.1 mm, and a preferable upper limit thereof is 3 mm. If the thickness of the interlayer film for laminated glass is below 0.1 mm, the penetration resistance of the laminated glass to be obtained may be reduced. If the thickness of the interlayer film for laminated glass exceeds 3 mm, the transparency of the interlayer film for laminated glass to be obtained may be reduced. A more preferable lower limit of the thickness of the interlayer film for laminated glass is 0.25 mm, and a more preferable upper limit thereof is 2 mm.

The interlayer film for laminated glass of the present invention may have a single layer structure consisting of only one resin layer, or may have a multilayer structure consisting of two or more laminated resin layers.

In the interlayer film for laminated glass of the present invention, the cross-section is preferably a wedge shape with a wedge angle $\theta$ of 0.1 to 1.0 mrad. If an interlayer film for laminated glass having a wedge shaped cross-section with a proper wedge angle is used for a head up display, the visibility of an instrument display can be enhanced.

The interlayer film for laminated glass of the present invention preferably has a sound-insulation layer having sound insulation property. Namely, when the interlayer film for laminated glass has a single layer structure consisting of only one resin layer, the only one resin layer is preferably a sound-insulation layer; and when the interlayer film for laminated glass has a multilayer structure consisting of two or more laminated resin layers, at least one of the resin layers is preferably a sound-insulation layer.

The sound-insulation layer is not particularly limited, and examples thereof include a layer including 40 parts by weight or more of a plasticizer based on 100 parts by weight of a polyvinyl acetal resin.

The interlayer film for laminated glass having a sound-insulation layer may have a wedge shaped cross-section.

When the interlayer film for laminated glass of the present invention is used for the window glass of vehicles such as automobiles and trains, buildings, and the like, the interlayer film for laminated glass may be partially colored. For example, when the interlayer film for laminated glass is used for the windshield of automobiles, the glare of direct sunlight and the like can be reduced by coloring the part of the interlayer film for laminated glass corresponding to the upper part of the windshield.

In the interlayer film for laminated glass of the present invention, the visible light transmission Tv measured in accordance with the method of JIS R 3106 is preferably 70% or more when the interlayer film for laminated glass is set to have a thickness of 760 μm and sandwiched between two glass plates. A visible light transmission Tv of less than 70% may lead to reduced transparency of the laminated glass which includes the interlayer film for laminated glass of the present invention. The visible light transmission Tv is more preferably 75% or more.

The device for measuring the visible light transmission Tv is not particularly limited, and examples thereof include a spectrophotometer ("U-4000", product of Hitachi, Ltd.).

In the interlayer film for laminated glass of the present invention, the visible light transmission Tv is preferably 70% or more after the interlayer film for laminated glass is set to have a thickness of 760 μm, sandwiched between two glass plates, and irradiated with ultraviolet rays for 2,000 hours using an ultraviolet ray irradiation device in accordance with JIS R 3205 (1998). If the visible light transmission Tv after the ultraviolet ray irradiation is below 70%, sufficient transparency of the laminated glass may not be ensured. The visible light transmission Tv after the ultraviolet ray irradiation is more preferably 75% or more.

The interlayer film for laminated glass of the present invention can reduce the transmittance of ultraviolet rays with a wave length of 400 nm. In the interlayer film for laminated glass of the present invention, the transmittance T (hereinafter, also referred to as T1) of ultraviolet rays with a wave length of 400 nm is 1% or less when the interlayer film for laminated glass is set to have a thickness of 760 μm and sandwiched between two glass plates.

The device for measuring the transmittance of ultraviolet rays with a wave length of 400 nm is not particularly limited, and examples thereof include a spectrophotometer ("U-4000", product of Hitachi, Ltd.).

In the interlayer film for laminated glass of the present invention, the transmittance T (hereinafter, also referred to as T2) of ultraviolet rays with a wave length of 400 nm is preferably 2% or less after the interlayer film for laminated glass is set to have a thickness of 760 μm, sandwiched between two glass plates, and irradiated with ultraviolet rays for 2,000 hours with an ultraviolet ray irradiation device in accordance with JIS R 3205 (1998). If the transmittance T of ultraviolet rays with a wave length of 400 nm after the ultraviolet ray irradiation exceeds 2%, the ultraviolet-ray-shielding-property may be reduced. The transmittance T of ultraviolet rays with a wave length of 400 nm after the ultraviolet ray irradiation is more preferably 1.5% or less, and further preferably 1% or less.

In the interlayer film for laminated glass of the present invention, the absolute value of the difference between T1 and T2 above is preferably 1 or less. If the absolute value of the difference between T1 and T2 is 1 or less, high light resistance can be achieved even when the laminated glass including the interlayer film for laminated glass of the present invention is used for applications used under exposure to ultraviolet rays, such as the window glass of vehicles such as automobiles and trains.

In the interlayer film for laminated glass of the present invention, the ultraviolet absorber represented by the formula (1) and the ultraviolet absorber represented by the formula (2) are used in combination, and the amount of these ultraviolet absorbers are adjusted in a specific range. Accordingly, the transmittance of ultraviolet rays with a wave length of 400 nm can be suppressed to 1% or less and high light resistance can be achieved, with a high transmittance of visible light maintained.

In the interlayer film for laminated glass of the present invention, the yellowness index is 5 or less when the interlayer film for laminated glass is set to have a thickness of 760 μm and sandwiched between two glass plates. If the yellowness index exceeds 5, the laminated glass may be too yellow.

The yellowness index herein refers to the yellowness index of the transmitted light of the laminated glass, as measured in accordance with JIS K 7103.

In the interlayer film for laminated glass of the present invention, the yellowness index is preferably 5 or less after the interlayer film for laminated glass is set to have a thickness of 760 μm, sandwiched between two glass plates, and irradiated with ultraviolet rays for 2,000 hours using an ultraviolet ray irradiation device in accordance with JIS R3205 (1998). If the yellowness index after the ultraviolet ray irradiation exceeds 5, the laminated glass may be too yellow.

As for the glass plates used in the measurement of the visible light transmission Tv, the transmittance T of ultraviolet rays with a wave length of 400 nm, and the yellowness index, 2-mm-thick green glass may be used, for example.

Examples of the method of producing the interlayer film for laminated glass of the present invention include the following method. The above plasticizer is mixed with the ultraviolet absorber represented by the formula (1) and the ultraviolet absorber represented by the formula (2). Optionally selected additives are added thereto to prepare a composition (hereinafter, also referred to as "ultraviolet absorber-plasticizer composition"). A thermoplastic resin such as a polyvinyl acetal resin is added thereto, and the mixture is sufficiently kneaded and then formed into an interlayer film for laminated glass.

In particular, the method preferably includes a step of preparing the ultraviolet absorber-plasticizer composition, in which the ultraviolet absorber represented by the formula (1) and the ultraviolet absorber represented by the formula (2) are dissolved in the plasticizer, and a step of kneading the ultraviolet absorber-plasticizer composition and a thermoplastic resin such as a polyvinyl acetal resin.

Examples of the method of kneading the ultraviolet absorber-plasticizer composition and the thermoplastic resin include a method of using an extruder.

The laminated glass including the interlayer film for laminated glass of the present invention and two glass plates, wherein the interlayer film for laminated glass is sandwiched between the two glass plates, is another aspect of the present invention.

The glass plates used for the laminated glass of the present invention are not particularly limited, and any transparent glass plates for general use may be used. Examples thereof include float glass plates, polished glass plates, molded plate glass, meshed plate glass, wired plate glass, infrared absorbing glass plates, infrared reflective glass plates, and green glass. Suitable among these is green glass.

The laminated glass of the present invention can suppress the transmittance of ultraviolet rays with a wave length of 400 nm to 1% or less while maintaining high transmittance of visible light, by using the interlayer film for laminated glass of the present invention.

The laminated glass preferably has a visible light transmittance of 70% or more, a transmittance of ultraviolet rays with a wave length of 400 nm of 1% or less, and a yellowness index of less than 5.

The applications of the laminated glass of the present invention are not particularly limited, and include the window glass of vehicles such as automobiles and trains and buildings. When the laminated glass is used for the glass for automobiles, the laminated glass is used for windshield, side glass, rear glass, and roof glass.

Advantageous Effects of Invention

The present invention can provide an interlayer film for laminated glass which can suppress the transmittance of ultraviolet rays with a wave length of 400 nm to 1% or less, and has high light resistance; and laminated glass including the interlayer film for laminated glass.

DESCRIPTION OF EMBODIMENTS

The present invention is described in more detail with reference to examples, to which the present invention is not limited.

(A) Preparation of Indole Compound A

To methanol (120 ml) were added 1-methyl-2-phenyl-1H-indole-3-carbaldehyde (23.5 g, 0.10 mol) and methyl cyanoacetate (11.9 g, 0.12 mol). Subsequently, piperidine (2.5 g, 0.03 mol) was added thereto. The mixture was reacted for six hours with reflux and then cooled to room temperature. Thereby, a precipitated crystal was obtained. The obtained crystal was washed with a small amount of alcohol and then dried. Thus, a pale yellow crystal (30.9 g) of indole compound A, in which $R^1$ is a methyl group and $R^2$ is a methyl group in the formula (1), was obtained. The melting point of the obtained indole compound A was 193.7° C.

(B) Preparation of Indole Compound B

A pale yellow crystal (28.9 g) of indole compound B, in which $R^1$ is an ethyl group and $R^2$ is a methyl group in the formula (1), was obtained by the same method used to prepare indole compound A, except that ethanol was replaced with methanol, and ethyl cyanoacetate (0.12 mol)

was replaced with methyl cyanoacetate. The melting point of the obtained indole compound B was 145° C.

(C) Preparation of Indole Compound C

A pale yellow crystal (32.7 g) of indole compound C, in which $R^1$ is an isopropyl group and $R^2$ is a methyl group in the formula (1), was obtained by the same method used to prepare indole compound A, except that isopropyl alcohol was replaced with methanol and isopropyl cyanoacetate (0.12 mol) was replaced with methyl cyanoacetate. The melting point of the obtained indole compound C was 170.1° C.

(D) Preparation of Indole Compound D

A pale yellow crystal (31.1 g) of indole compound D, in which $R^1$ is a methyl group and $R^2$ is an ethyl group in the formula (1), was obtained by the same method used to prepare indole compound A, except that 1-ethyl-2-phenyl-1H-indole-3-carbaldehyde (0.10 mol) was replaced with 1-methyl-2-phenyl-1H-indole-3-carbaldehyde.

(E) Preparation of Indole Compound E

A pale yellow crystal (30.8 g) of indole compound E, in which $R^1$ is an ethyl group and $R^2$ is an ethyl group in the formula (1), was obtained by the same method used to prepare indole compound A, except that ethanol was replaced with methanol, ethyl cyanoacetate (0.12 mol) was replaced with methyl cyanoacetate, and 1-ethyl-2-phenyl-1H-indole-3-carbaldehyde (0.10 mol) was replaced with 1-methyl-2-phenyl-1H-indole-3-carbaldehyde.

(F) Preparation of Indole Compound F

A pale yellow crystal (31.7 g) of indole compound F, in which $R^1$ is an isopropyl group and $R^2$ is an ethyl group in the formula (1), was obtained by the same method used to prepare indole compound A, except that isopropyl alcohol was replaced with methanol, isopropyl cyanoacetate (0.12 mol) was replaced with methyl cyanoacetate, and 1-ethyl-2-phenyl-1H-indole-3-carbaldehyde (0.10 mol) was replaced with -methyl-2-phenyl-1H-indole-3-carbaldehyde.

(G) Preparation of Indole Compound G

A pale yellow crystal (33.7 g) of indole compound G, in which $R^1$ is a methyl group and $R^2$ is a n-butyl group in the formula (1), was obtained by the same method used to prepare indole compound A, except that 1-n-butyl-2-phenyl-1H-indole-3-carbaldehyde (0.10 mol) was replaced with 1-methyl-2-phenyl-1H-indole-3-carbaldehyde.

(H) Preparation of Indole Compound H

A pale yellow crystal (31.0 g) of indole compound H, in which $R^1$ is an ethyl group and $R^2$ is a t-butyl group in the formula (1), was obtained by the same method used to prepare indole compound A, except that ethanol was replaced with methanol, ethyl cyanoacetate (0.12 mol) was replaced with methyl cyanoacetate, and 1-t-butyl-2-phenyl-1H-indole-3-carbaldehyde (0.10 mol) was replaced the 1-methyl-2-phenyl-1H-indole-3-carbaldehyde.

(I) Preparation of indole compound I

A pale yellow crystal (31.3 g) of indole compound I, in which $R^1$ is an isopropyl group and $R^2$ is a t-butyl group in the formula (1), was obtained by the same method used to prepare indole compound A, except that isopropyl alcohol was replaced with methanol, isopropyl cyanoacetate (0.12 mol) was replaced the methyl cyanoacetate, and 1-t-butyl-2-phenyl-1H-indole-3-carbaldehyde (0.10 mol) was replaced the 1-methyl-2-phenyl-1H-indole-3-carbaldehyde.

EXAMPLE 1

(1) Production of Interlayer Film for Laminated Glass

A polyvinyl butyral resin was mixed with the following additives in the following amount: 28% by weight of triethylene glycol di-2-ethylhexanoate (3GO) as a plasticizer, 0.1% by weight of 2,6-di-t-butyl-p-cresol (BHT) as an antioxidant, 0.01% by weight of indole compound A as the ultraviolet absorber represented by the formula (1), and 0.7% by weight of 2-(3-t-butyl-5-methyl-2-hydroxy phenyl)-5-chloro benzotriazole as the ultraviolet absorber represented by the formula (2) ($R^3$=a methyl group, $R^4$=a tert-butyl group), in the interlayer film for laminated glass to be obtained. The mixture was formed into an interlayer film for laminated glass with a layer thickness of 760 μm using a counter-rotating twin-screw extruder. Here, in order to adjust the adhesion of the interlayer film for laminated glass, an aqueous solution of organic acid magnesium was added in an amount such that the Mg concentration in the interlayer film for laminated glass was 65 ppm.

(2) Production of Laminated Glass

The obtained interlayer film for laminated glass was placed in a constant temperature and humidity condition of a temperature of 23° C. and a relative humidity of 28% for four hours. Then, the interlayer film for laminated glass was sandwiched between two sheets of transparent green glass (length of 300 mm×width of 300 mm×thickness of 2 mm) to produce a laminated product. The obtained laminated product was temporarily pressure-bonded with a heating roll heated to 230° C. The temporarily pressure-bonded laminated glass was pressure-bonded with an autoclave at a temperature of 135° C. and a pressure of 1.2 MPa for 20 minutes to produce laminated glass.

EXAMPLES 2 TO 13, COMPARATIVE EXAMPLES 1 TO 13

An interlayer film for laminated glass and laminated glass were produced in the same manner as in Example 1, except that the kind and amount of the ultraviolet absorber represented by the formula (1) and the ultraviolet absorber represented by the formula (2) were changed according to Tables 1 and 2.

EXAMPLES 14 TO 25, COMPARATIVE EXAMPLES 14 TO 33

An interlayer film for laminated glass and laminated glass were produced in the same manner as in Example 1, except that the kind and amount of the ultraviolet absorber represented by the formula (1) and the ultraviolet absorber represented by the formula (2) were changed according to Tables 3 to 5, and the ultraviolet absorber (Tinuvin 328, product of BASF) represented by the formula (3) as another ultraviolet absorber was added in an amount shown in Table 5.

In Examples 14 to 25 and Comparative Examples 14 to 33, a polyvinyl butyral resin (butyralization (acetalization) degree: 68.5 mol %, amount of hydroxyl groups: 30.6 mol %, amount of acetyl groups: 0.9 mol %) which was obtained through butyralization of a polyvinyl alcohol having an average polymerization degree of 1,700 with n-butyl aldehyde was used as the polyvinyl butyral resin.

[Chem. 2]

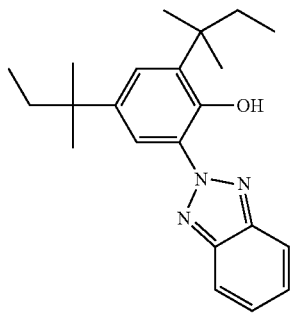

(3)

(Evaluation)

The obtained laminated glass was irradiated with ultraviolet rays for 2,000 hours with an ultraviolet ray irradiation device in accordance with JIS R 3205 (1998). The visible light transmission Tv, the transmittance of ultraviolet rays with a wave length of 400 nm, and the yellowness index were measured both before and after the ultraviolet ray irradiation, and the difference (absolute value) of the transmittance between before and after the irradiation was also measured.

The measurement was carried out by a spectrophotometer ("U-4000", product of Hitachi, Ltd.) in accordance with JIS R 3106 (1998).

The results are shown in Tables 1 to 5.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Amount of ultra violet absorber (wt %) | Ultraviolet absorber represented by formula (1) | Indole compound A | 0.0100 | — | — | — | — | — | — | — | — | — | — | — | — |
| | | Indole compound B | — | 0.0010 | — | — | — | — | — | — | — | — | — | — | — |
| | | Indole compound C | — | — | 0.0100 | — | — | — | — | — | — | — | — | — | — |
| | | Indole compound D | — | — | — | 0.0500 | — | — | — | — | — | — | — | — | — |
| | | Indole compound E | — | — | — | — | 0.0100 | — | — | — | — | — | — | — | — |
| | | Indole compound F | — | — | — | — | — | 0.0100 | — | — | — | — | — | — | — |
| | | Indole compound G | — | — | — | — | — | — | 0.0010 | — | — | — | — | — | — |
| | | Indole compound H | — | — | — | — | — | — | — | 0.0100 | — | — | — | — | — |
| | | Indole compound I | — | — | — | — | — | — | — | — | 0.0500 | — | — | — | — |
| | | Indole compound I | — | — | — | — | — | — | — | — | — | 0.0100 | — | — | — |
| | | Indole compound I | — | — | — | — | — | — | — | — | — | — | 0.0100 | — | — |
| | | Indole compound I | — | — | — | — | — | — | — | — | — | — | — | 0.0100 | — |
| | | Indole compound I | — | — | — | — | — | — | — | — | — | — | — | — | 0.0100 |
| | Ultraviolet absorber represented by formula (2) | $R^3$ = Methyl group $R^4$ = tert-Butyl group | 0.70 | 1.00 | 0.70 | 0.70 | 0.70 | 0.70 | 1.00 | 0.70 | 0.70 | 0.70 | 0.70 | 0.70 | 0.70 |
| Evaluation | Visible light transmission Tv (%) | Before light resistance test | 79.8 | 79.7 | 79.8 | 79.7 | 79.6 | 79.8 | 79.6 | 79.7 | 79.7 | 79.6 | 79.9 | 79.8 | 79.7 |
| | | After light resistance test | 79.4 | 79.2 | 79.2 | 79.3 | 79.1 | 79.1 | 79.0 | 79.2 | 79.3 | 79.2 | 79.3 | 79.2 | 79.1 |
| | Transmittance T (%) of ultraviolet rays with a wave length of 400 nm | Before light resistance test | 0.5 | 0.8 | 0.6 | 0.3 | 0.5 | 0.7 | 0.8 | 0.6 | 0.2 | 0.5 | 0.5 | 0.6 | 0.6 |
| | | After light resistance test | 0.7 | 0.9 | 0.9 | 0.8 | 0.8 | 0.9 | 0.8 | 0.8 | 0.6 | 0.7 | 0.8 | 0.8 | 0.9 |
| | | Difference between before and after the test (absolute value) | 0.2 | 0.1 | 0.3 | 0.5 | 0.3 | 0.2 | 0.0 | 0.2 | 0.4 | 0.2 | 0.3 | 0.2 | 0.3 |
| | Yellowness index | Before light resistance test | 3.2 | 2.9 | 3.3 | 4.0 | 2.8 | 3.1 | 2.6 | 2.9 | 3.8 | 3.0 | 3.3 | 3.1 | 3.0 |
| | | After light resistance test | 2.8 | 2.8 | 2.8 | 3.3 | 2.5 | 2.7 | 2.5 | 2.6 | 3.2 | 2.6 | 3.0 | 2.6 | 2.5 |

TABLE 2

| | | Comparative Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Amount of ultra violet absorber (wt %) | Ultraviolet absorber | — | 0.0005 | — | — | — | — | — | — | — | — | — | — | — |
| | represented by formula (1) Indole compound A | | | | | | | | | | | | | |
| | Indole compound B | — | — | 0.0005 | — | — | — | — | — | — | — | — | — | — |
| | Indole compound C | — | — | — | 0.0005 | — | — | — | — | — | — | — | — | — |
| | Indole compound D | — | — | — | — | 0.0005 | — | — | — | — | — | — | — | — |
| | Indole compound E | — | — | — | — | — | 0.0005 | — | — | — | — | — | — | — |
| | Indole compound F | — | — | — | — | — | — | 0.0005 | — | — | — | — | — | — |
| | Indole compound G | — | — | — | — | — | — | — | 0.0005 | — | — | — | — | — |
| | Indole compound H | — | — | — | — | — | — | — | — | 0.0005 | — | — | — | — |
| | Indole compound I | — | — | — | — | — | — | — | — | — | 0.0005 | — | — | — |
| | Ultraviolet absorber represented by formula (2) $R^3$ = Methyl group | — | — | — | — | — | — | — | — | — | — | 0.0340 | — | — |
| | $R^4$ = tert-Butyl group | 0.05 | 0.05 | 0.05 | 0.05 | 0.05 | 0.05 | 0.05 | 0.05 | 0.05 | 0.05 | 0.28 | 0.0340 0.28 | 0.0340 0.28 |
| Evaluation | Visible light transmission Tv (%) Before light resistance test | 79.8 | 79.7 | 79.7 | 79.7 | 79.6 | 79.9 | 79.8 | 79.8 | 79.7 | 79.7 | 79.6 | 79.8 | 79.7 |
| | After light resistance test | 79.3 | 79.1 | 79.2 | 79.1 | 79.3 | 79.2 | 79.1 | 79.2 | 79.3 | 79.1 | 79.2 | 79.3 | 79.3 |
| | Transmittance T (%) of ultraviolet rays with a wave length of 400 nm Before light resistance test | 31.1 | 13.5 | 14.1 | 12.8 | 13.8 | 14.2 | 12.9 | 13.6 | 12.4 | 13.7 | 0.3 | 0.3 | 0.3 |
| | After light resistance test | 30.9 | 13.2 | 14.2 | 12.6 | 13.5 | 14.2 | 13.1 | 13.4 | 12.1 | 13.6 | 2.3 | 2.5 | 2.2 |
| | Difference between before and after the test (absolute value) | 0.2 | 0.3 | 0.1 | 0.2 | 0.3 | 0.0 | 0.2 | 0.2 | 0.3 | 0.1 | 2.0 | 2.2 | 1.9 |
| | Yellowness index Before light resistance test | −1.1 | 1.3 | 1.1 | 1.6 | 1.3 | 1.1 | 1.8 | 1.4 | 1.7 | 1.2 | 3.3 | 3.6 | 3.5 |
| | After light resistance test | −0.6 | 1.2 | 1.0 | 1.4 | 1.2 | 1.0 | 1.6 | 1.3 | 1.5 | 1.1 | 2.4 | 2.4 | 2.5 |

TABLE 3

| | | | Example | | | | | | | | | | |
|---|---|---|---|---|---|---|---|---|---|---|---|---|---|
| | | | 14 | 15 | 16 | 17 | 18 | 19 | 20 | 21 | 22 | 23 | 24 | 25 |
| Amount of ultra violet absorber (wt %) | Ultraviolet absorber represented by formula (1) | Indole compound A | 0.0340 | — | — | — | — | — | — | — | — | — | — | — |
| | | Indole compound B | — | 0.0340 | — | — | — | — | — | — | — | — | — | — |
| | | Indole compound C | — | — | — | — | — | — | — | — | — | 0.0100 | — | — |
| | | Indole compound D | — | — | — | — | — | — | 0.0340 | — | — | — | — | — |
| | | Indole compound E | — | — | — | — | — | — | — | — | — | — | — | — |
| | | Indole compound F | — | — | 0.0340 | — | — | — | — | — | — | — | — | — |
| | | Indole compound G | — | — | — | — | — | — | — | 0.0340 | — | — | — | — |
| | | Indole compound H | — | — | — | — | 0.0100 | — | — | — | — | — | 0.0100 | — |
| | | Indole compound I | — | — | — | 0.0340 | — | 0.0340 | — | — | 0.0340 | — | — | 0.0100 |
| | Ultraviolet absorber represented by formula (2) | $R^3$ = Methyl group $R^4$ = tert-Butyl group | 0.70 | 0.70 | 0.70 | 0.70 | 1.00 | 1.00 | 1.00 | 1.00 | 1.00 | 1.00 | 1.00 | 1.00 |
| Evaluation | Visible light transmission Tv (%) | Before light resistance test | 79.6 | 79.6 | 79.5 | 79.6 | 79.6 | 79.5 | 79.6 | 79.5 | 79.5 | 79.6 | 79.6 | 79.5 |
| | | After light resistance test | 79.3 | 79.4 | 79.4 | 79.4 | 79.5 | 79.3 | 79.3 | 79.3 | 79.3 | 79.5 | 79.4 | 79.3 |
| | Transmittance T (%) of ultraviolet rays with a wave length of 400 nm | Before light resistance test | 0.1 | 0.2 | 0.1 | 0.1 | 0.3 | 0.1 | 0.1 | 0.1 | 0.1 | 0.3 | 0.3 | 0.3 |
| | | After light resistance test | 0.9 | 0.8 | 0.8 | 0.9 | 0.6 | 0.5 | 0.5 | 0.6 | 0.6 | 0.7 | 0.8 | 0.8 |
| | | Difference between before and after the test (absolute value) | 0.8 | 0.6 | 0.7 | 0.8 | 0.3 | 0.4 | 0.4 | 0.5 | 0.5 | 0.4 | 0.5 | 0.5 |
| | Yellowness index | Before light resistance test | 5.5 | 5.6 | 5.4 | 5.5 | 5.0 | 6.0 | 6.0 | 6.2 | 6.1 | 6.5 | 6.1 | 6.0 |
| | | After light resistance test | 2.8 | 2.6 | 2.6 | 2.4 | 3.5 | 3.0 | 3.2 | 3.2 | 3.0 | 3.2 | 3.3 | 3.0 |

TABLE 4

|  |  |  | Comparative Example | | | | | | |
|---|---|---|---|---|---|---|---|---|---|
|  |  |  | 14 | 15 | 16 | 17 | 18 | 19 | 20 |
| Amount of ultra violet absorber (wt %) | Ultraviolet absorber represented by formula (1) | Indole compound A | 0.0005 | 0.0100 | 0.0340 | — | — | — | 0.0005 |
|  |  | Indole compound B | — | — | — | — | — | — | — |
|  |  | Indole compound C | — | — | — | 0.0100 | — | — | — |
|  |  | Indole compound D | — | — | — | — | — | — | — |
|  |  | Indole compound E | — | — | — | — | — | — | — |
|  |  | Indole compound F | — | — | — | — | 0.0100 | — | — |
|  |  | Indole compound G | — | — | — | — | — | — | — |
|  |  | Indole compound H | — | — | — | — | — | — | — |
|  |  | Indole compound I | — | — | — | — | — | 0.0100 | — |
|  | Ultraviolet absorber represented by formula (2) | $R^3$ = Methyl group $R^4$ = tert-Butyl group | 0.28 | 0.28 | 0.28 | 0.28 | 0.28 | 0.28 | 0.70 |
| Evaluation | Visible light transmission Tv (%) | Before light resistance test | 80 | 79.8 | 79.7 | 79.6 | 79.7 | 79.6 | 79.7 |
|  |  | After light resistance test | 79.5 | 79.5 | 79.2 | 79.5 | 79.5 | 79.4 | 79.4 |
|  | Transmittance T (%) of ultraviolet rays with a wave length of 400 nm | Before light resistance test | 8.4 | 2.1 | 0.3 | 2.2 | 2.2 | 2.1 | 2.0 |
|  |  | After light resistance test | 8.5 | 3.8 | 2.3 | 4.3 | 4.4 | 4.8 | 2.1 |
|  |  | Difference between before and after the test (absolute value) | 0.1 | 1.7 | 2.0 | 2.1 | 2.2 | 2.5 | 0.1 |
|  | Yellowness index | Before light resistance test | −0.8 | 2.2 | 3.3 | 2.2 | 2.3 | 2.2 | 1.0 |
|  |  | After light resistance test | −0.8 | 1.5 | 2.4 | 1.7 | 1.6 | 1.7 | 0.8 |

TABLE 5

| | | | | | | | | Comparative Example | | | | | | |
|---|---|---|---|---|---|---|---|---|---|---|---|---|---|---|
| | | 21 | 22 | 23 | 24 | 25 | 26 | 27 | 28 | 29 | 30 | 31 | 32 | 33 |
| Amount of ultra violet absorber (wt %) | Ultraviolet absorber represented by formula (1) | Indole compound A | — | 0.0100 | 0.0500 | — | — | — | — | — | — | — | — | — | — |
| | | Indole compound B | — | — | — | — | 0.0500 | — | — | — | — | — | — | — | — |
| | | Indole compound C | — | — | — | — | — | — | 0.0500 | — | — | — | — | — | — |
| | | Indole compound D | — | — | — | — | — | 0.0500 | — | — | — | — | — | — | — |
| | | Indole compound E | — | — | — | — | — | — | — | 0.0500 | — | — | — | — | — |
| | | Indole compound F | — | — | — | — | — | — | — | — | 0.0500 | — | — | — | — |
| | | Indole compound G | — | — | — | — | — | — | — | — | — | 0.0500 | — | — | — |
| | | Indole compound H | — | — | — | — | — | — | — | — | — | — | 0.0500 | — | — |
| | | Indole compound I | — | — | — | — | — | — | — | — | — | — | — | 0.0500 | — |
| | Ultraviolet absorber represented by formula (2) | $R^3$ = Methyl group $R^4$ = tert-Butyl group | — | — | — | — | — | — | — | — | — | — | — | — | 0.0500 |
| | Ultraviolet absorber represented by formula (3) | Tinuvin 328 | 0.028 | 0.028 | 0.028 | 0.700 | 0.700 | 0.700 | 0.700 | 0.700 | 0.700 | 0.700 | 0.700 | 0.700 | 0.700 |
| Evaluation | Visible light transmission Tv (%) | Before light resistance test | 80.3 | 79.5 | 80.2 | 80.2 | 79.9 | 79.8 | 79.7 | 79.8 | 79.7 | 79.9 | 79.8 | 79.9 | 79.9 |
| | | After light resistance test | 80.0 | 79.5 | 79.9 | 79.9 | 79.6 | 79.5 | 79.6 | 79.6 | 79.6 | 79.6 | 79.5 | 79.4 | 79.6 |
| | Transmittance T (%) of ultraviolet rays with a wave length of 400 nm | Before light resistance test | 56.3 | 19.4 | 1.4 | 35.4 | 0.8 | 0.8 | 0.9 | 0.8 | 0.9 | 0.9 | 0.9 | 0.9 | 1.0 |
| | | After light resistance test | 56.0 | 33.2 | 6.3 | 34.9 | 4.8 | 5.3 | 6.2 | 4.9 | 5.5 | 6.8 | 4.7 | 4.6 | 7.0 |
| | | Difference between before and after the test (absolute value) | 0.3 | 13.8 | 4.9 | 0.5 | 4.0 | 4.5 | 5.3 | 4.1 | 4.6 | 5.9 | 3.8 | 3.7 | 6.0 |
| | Yellowness index | Before light resistance test | −1.1 | 2.3 | 5.5 | −1.9 | 6.2 | 6.3 | 6.3 | 6.5 | 6.4 | 6.3 | 6.4 | 6.5 | 6.3 |
| | | After light resistance test | −0.6 | 1.5 | 2.3 | −1.6 | 1.8 | 1.9 | 1.8 | 1.6 | 1.7 | 1.8 | 1.7 | 1.6 | 1.5 |

INDUSTRIAL APPLICABILITY

The present invention provides an interlayer film for laminated glass which can suppress the transmittance of ultraviolet rays with a wave length of 400 nm to 1% or less, and has high light resistance; and laminated glass including the interlayer film for laminated glass.

The invention claimed is:
1. An interlayer film for laminated glass comprising:
a thermoplastic resin,
an ultraviolet absorber having a structure of the following formula (1), and
an ultraviolet absorber having a structure of the following formula (2),
wherein an amount of the ultraviolet absorber having the structure of formula (1) is 0.001 to 0.05% by weight, and an amount of the ultraviolet absorber having the structure of formula (2) is 0.5 to 1.0% by weight;

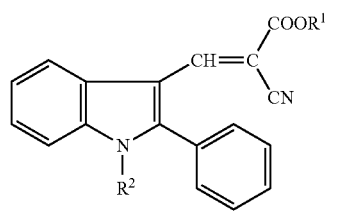

(1)

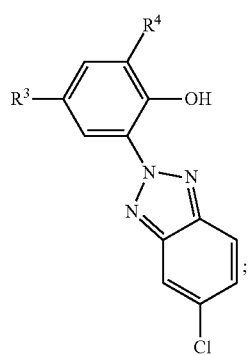

(2)

wherein $R^1$ is a $C_{1-3}$ alkyl group; $R^2$ is hydrogen, a $C_{1-10}$ alkyl group, or a $C_{7-10}$ aralkyl group; $R^3$ is hydrogen or a $C_{1-8}$ alkyl group; and $R^4$ is hydrogen or a $C_{1-8}$ alkyl group.

2. The interlayer film for laminated glass according to claim 1, further comprising triethylene glycol di-2-ethylhexanoate.

3. The interlayer film for laminated glass according to claim 1, wherein the thermoplastic resin is a polyvinyl acetal resin.

4. The interlayer film for laminated glass according to claim 1, wherein the thermoplastic resin is a polyvinyl butyral resin.

5. The interlayer film for laminated glass according to claim 1, wherein the amount of the ultraviolet absorber having the structure of formula (1) is 0.01 to 0.04% by weight, and the amount of the ultraviolet absorber having the structure of formula (2) is 0.6 to 1.0% by weight.

6. The interlayer film for laminated glass according to claim 1, further comprising an infrared absorbing agent.

7. The interlayer film for laminated glass according to claim 6, wherein the infrared absorbing agent is made of tin-doped indium oxide particles.

8. The interlayer film for laminated glass according to claim 1, wherein a cross-section of the interlayer film for laminated glass is a wedge shape with a wedge angle θ of 0.1 to 1.0 mrad.

9. The interlayer film for laminated glass according to claim 1, comprising a sound-insulation layer.

10. The interlayer film for laminated glass according to claim 1, wherein at least one part of the interlayer film for laminated glass is colored.

11. The interlayer film for laminated glass according to claim 1, wherein a yellowness index is 5 or less when the interlayer film for laminated glass is set to have a thickness of 760 μm and sandwiched between two glass plates.

12. The interlayer film for laminated glass according to claim 1, wherein a visible light transmission Tv is 70% or more after the interlayer film for laminated glass is set to have a thickness of 760 μm, sandwiched between two glass plates, and irradiated with ultraviolet rays for 2,000 hours using an ultraviolet rays irradiation device in accordance with JIS R 3205 (1998).

13. The interlayer film for laminated glass according to claim 1, wherein a yellowness index is 5 or less after the interlayer film for laminated glass is set to have a thickness of 760 μm, sandwiched between two glass plates, and irradiated with ultraviolet rays for 2,000 hours using an ultraviolet ray irradiation device in accordance with JIS R 3205 (1998).

14. The interlayer film for laminated glass according to claim 1, wherein the interlayer film for laminated glass has an absolute value of 1 or less, where the absolute value is given by the difference between the transmittance of ultraviolet rays with a wave length of 400 nm of the interlayer film for laminated glass, after being set to have a thickness of 760 μm and sandwiched between two glass plates, and the transmittance of ultraviolet rays with a wave length of 400 nm of the interlayer film for laminated glass, after being set to have a thickness of 760 μm, sandwiched between two glass plates, and irradiated with ultraviolet rays for 2,000 hours using an ultraviolet ray irradiation device in accordance with JIS R 3205 (1998).

15. A laminated glass comprising:
the interlayer film for laminated glass according to claim 1, and
two glass plates,
wherein the interlayer film for laminated glass is sandwiched between the two glass plates.

16. The laminated glass according to claim 15, wherein the glass plates are made of 2-mm-thick green glass.

* * * * *